United States Patent
Kirkham et al.

(10) Patent No.: US 12,326,572 B2
(45) Date of Patent: Jun. 10, 2025

(54) NANO-TEXTURED ATTENUATOR FOR USE WITH LASER BEAM PROFILING AND LASER BEAM CHARACTERIZATION SYSTEMS AND METHOD OF USE

(71) Applicant: Ophir-Spiricon, LLC, North Logan, UT (US)

(72) Inventors: Kevin Kirkham, North Logan, UT (US); Kenneth Ferree, North Logan, UT (US)

(73) Assignee: Ophir-Spiricon, LLC, North Logan, UT (US)

( * ) Notice: Subject to any disclaimer, the term of this patent is extended or adjusted under 35 U.S.C. 154(b) by 57 days.

(21) Appl. No.: 18/132,411

(22) Filed: Apr. 9, 2023

(65) Prior Publication Data

US 2023/0296909 A1    Sep. 21, 2023

Related U.S. Application Data

(63) Continuation of application No. 16/906,335, filed on Jun. 19, 2020, now abandoned.
(Continued)

(51) Int. Cl.
*G01J 1/42* (2006.01)
*G02B 27/28* (2006.01)

(52) U.S. Cl.
CPC .......... *G02B 27/281* (2013.01); *G01J 1/4257* (2013.01)

(58) Field of Classification Search
CPC ............................ G01J 1/4257; G02B 27/281
See application file for complete search history.

(56) References Cited

U.S. PATENT DOCUMENTS

| | | | |
|---|---|---|---|
| 5,329,350 A | 7/1994 | Wright et al. | |
| 5,371,655 A | 12/1994 | Murdock et al. | |
| 6,497,490 B1 | 12/2002 | Miller et al. | |
| 10,423,047 B2 * | 9/2019 | Bellos | B23K 26/02 |
| 2001/0028664 A1 | 10/2001 | Volger et al. | |

(Continued)

FOREIGN PATENT DOCUMENTS

| | | |
|---|---|---|
| CN | 104238107 A | 12/2014 |
| JP | 1996015638 A | 1/1996 |

(Continued)

OTHER PUBLICATIONS

The European Search Report issued for EP counterpart application No. 20831625.7 dated Jul. 6, 2023 (8 pages).

(Continued)

*Primary Examiner* — Kevin K Pyo
(74) *Attorney, Agent, or Firm* — Edward Scott Trask

(57) ABSTRACT

The present application discloses a nano-textured attenuator which includes a body defining an input aperture, a measurement aperture, and at least one beam dump aperture. At least one coupling fixture may be formed on or positioned on the body, a first nano-textured beamsplitter is positioned within the body and configured to transmit 85% to 99.9999% of an input beam therethrough while reflecting 0.0001% of the input beam to form a partially attenuated beam, at least a second nano-textured beamsplitter is also positioned within the body and is configured to transmit 85% to 99.9999% of the partially attenuated beam therethrough while reflecting 0.0001% of the partially attenuated beam to form an attenuated measurement beam, and at least one camera in communication with the measurement aperture be configured to measure at least one optical characteristic of the attenuated measurement beam.

11 Claims, 6 Drawing Sheets

Related U.S. Application Data

(60) Provisional application No. 62/865,160, filed on Jun. 22, 2019.

(56) References Cited

U.S. PATENT DOCUMENTS

| | | | |
|---|---|---|---|
| 2005/0215986 A1* | 9/2005 | Chernyak | B23K 26/705 356/10 |
| 2011/0244692 A1 | 10/2011 | Jeong et al. | |
| 2019/0061063 A1 | 2/2019 | Kuki et al. | |

FOREIGN PATENT DOCUMENTS

| | | |
|---|---|---|
| JP | 2001174327 A | 6/2001 |
| JP | 2002188957 A | 7/2002 |
| JP | 2005214752 A | 8/2005 |
| JP | 2017182065 A | 10/2017 |
| WO | 2001059414 A1 | 8/2001 |
| WO | 2015011786 A1 | 1/2015 |

OTHER PUBLICATIONS

The Office Action issued for JP counterpart application No. 2021-576284 dated Apr. 9, 2024 (5 pages).
The PCT international Search Report issued to PCT/US2020/038389 on Oct. 7, 2020, 3 pages.
The PCT Written Opinion issued to PCT/US2020/038389 on Oct. 7, 2020, 6 pages.

* cited by examiner

NANO-TEXTURED ATTENUATOR FOR USE WITH LASER BEAM PROFILING AND LASER BEAM CHARACTERIZATION SYSTEMS AND METHOD OF USE

CROSS-REFERENCE TO RELATED APPLICATIONS

The present application is a continuation of U.S. application Ser. No. 16/906,335 filed on Jun. 20, 2020, entitled "Nano-Textured Attenuator for Use with Laser Beam Profiling and Laser Beam Characterization Systems and Methods of Use" which claims priority to U.S. provisional application No. 62/865,160, filed on Jun. 22, 2019 and entitled "Nano-Textured Attenuator for Use with Laser Beam Profiling and Laser Beam Characterization Systems and Methods of Use", the entire contents of both are incorporated by reference herein.

BACKGROUND

Increasingly, laser systems offering high output powers from about 500 W to 5000 W or more are being implemented in various fields. Often, laser measurement systems are used to monitor the performance of such laser systems. Typically, these measurements, which include beam profiling, spectral observations, temporal observations, or intensity observations are performed by creating a sample of the intensity map at a plane transverse to the propagation axis of the laser beam.

While laser output measurements including beam profiling and laser beam characterization has proven useful in monitoring the performance of low-power laser systems, a number of shortcomings have been identified when these systems are used to monitor the performance of high power laser systems. For example, 2-D matrix sensors such as CCD devices, CMOS devices, pyroelectric devices, and/or InGaAs devices are saturated at fluences several magnitudes less than the fluences of the output beams of the high-power laser systems under test. As a result, presently available beam profiling systems, high laser power measurement systems, and similar laser power measurement systems utilize one or more thin-film coated attenuators to reduce output beam fluence. Unfortunately, the power densities of many high-power laser system output beams exceed the damage threshold of thin-film reflective coatings used in making thin-film coated attenuators. As such, the performance of thin-film coated attenuators tends to degrade, thereby permitting potentially damaging fluence to be incident on sensitive cameras and sensors used in laser beam profiling systems and/or measurement systems.

In light of the foregoing, there is an ongoing need for durable attenuator devices for use in high laser power beam profiling systems and laser beam characterization systems.

SUMMARY

The present application discloses various embodiments of a nano-textured attenuator for use with a variety of laser beam profiling systems, laser power measurement systems, and various other systems configured to measure or otherwise characterize laser output signals or beams. In one embodiment, the nano-textured attenuators disclosed herein are well suited for use with laser outputs in excess of about 200 W to 5000 W (i.e. high power) or more, although those skilled in the art will appreciate that the various embodiments of the nano-textured attenuator disclosed herein may be used at any variety of laser powers.

In one embodiment, the nano-textured attenuator includes a body defining an input aperture, a measurement aperture, and at least one beam dump aperture. At least one coupling fixture may be formed on or positioned on the body. In one embodiment, the coupling fixture is positioned proximate to the measurement aperture. A first nano-textured beamsplitter is positioned within the body. During use, the first nano-textured beamsplitter is configured to transmit 85% to 99.9999% of an input beam therethrough while reflecting 0.0001% to form at least one partially attenuated beam. At least a second nano-textured beamsplitter is positioned within the body. During use, the second nano-textured beamsplitter is configured to transmit 85% to 99.9999% of the partially attenuated beam therethrough while reflecting 0.0001% of the partially attenuated beam to form at least one attenuated measurement beam. At least one camera in communication with the measurement aperture is configured to measure at least one optical characteristic of the attenuated measurement beam. The nano-textured attenuator of claim 1 may further comprise at least one selectively movable mount configured to adjustably support at least one of the first nano-textured beamsplitter and the second nano-textured beamsplitter. A protective window may be installed in at least one of the at least one input aperture, the at least one measurement aperture, and the at least one first beam dump aperture. The 85% to 99.9999% of the at least one partially attenuated beam may form a second output beam directed through at least one second beam dump aperture. In one embodiment, a power of the attenuated measurement beam is approximately 0.0001% of a power of the input beam. In another embodiment, a power of the attenuated measurement beam is approximately 0.00001% of a power of the input beam. In another embodiment, a power of the attenuated measurement beam is approximately 0.000001% of a power of the input beam. In another embodiment, a power of the attenuated measurement beam is approximately 0.0000001% of a power of the input beam.

In another embodiment, the nano-textured attenuator includes a body defining an input aperture, a measurement aperture, and at least one beam dump aperture. At least one coupling fixture may be formed on or positioned on the body. In one embodiment, the coupling fixture is positioned proximate to the measurement aperture. A nano-textured beamsplitter is positioned within the body. During use, the nano-textured beamsplitter is configured to transmit 85% to 99.9999% of an input beam therethrough while reflecting 0.0001% to form at least one partially attenuated beam. At least one nano-textured optical component is positioned within the body. During use, the nano-textured optical component is configured to transmit 85% to 99.9999% of the partially attenuated beam therethrough while reflecting 0.0001% to form at least one attenuated measurement beam. At least one camera in communication with the measurement aperture be configured to measure at least one optical characteristic of the attenuated measurement beam. The nano-textured attenuator of claim 1 may further comprise at least one selectively movable mount configured to adjustably support at least one of the first nano-textured beamsplitter and the nano-textured optical component. A protective window may be installed in at least one of the at least one input aperture, the at least one measurement aperture, and the at least one first beam dump aperture. The 85% to 99.9999% of the at least one partially attenuated beam may form a second output beam directed through at least one second beam dump aperture. In one embodiment, a power of the attenuated measurement beam is approximately 0.0001% of a power of the input beam. In another embodiment, a power of the attenuated measurement beam is approximately 0.00001% of a power of the input beam. In another embodiment, a power of the attenuated measurement beam is approximately 0.000001% of a power of the input beam. In another embodiment, a power of the attenuated measurement beam is approximately 0.0000001% of a power of the input beam.

The present application also discloses a method of measuring high laser power optical signal which includes directing at least one input beam to a first nano-textured beamsplitter. A portion of the input beam is reflected with the first nano-textured beamsplitter to form at least one partially attenuated beam. The partially attenuated beam has 0.0001% to 15% of the power of the input beam while transmitting 85% to 99.9999% of the input beam through the first nano-textured beamsplitter. Thereafter, a portion of the partially attenuated beam from the first nano-textured beamsplitter is reflected by at least a second nano-textured beamsplitter to form at least one attenuated measurement beam. The attenuated measurement beam has 0.0001% to 15% of the power of the partially attenuated beam while transmitting 85% to 99.9999% of the partially attenuated beam through the second nano-textured beamsplitter. Finally, at least one optical characteristic of the attenuated measurement beam may be measured with at least one sensor system.

Other features and advantages of the nano-textured attenuator for use with laser beam profiling and laser beam characterization systems as described herein will become more apparent from a consideration of the following detailed description.

BRIEF DESCRIPTION OF THE DRAWINGS

The novel aspects of the embodiments of a nano-textured attenuator for use with laser beam profiling laser beam characterization systems as disclosed herein will be more apparent by consideration of the following figures, wherein.

DETAILED DESCRIPTION

Figure 1:
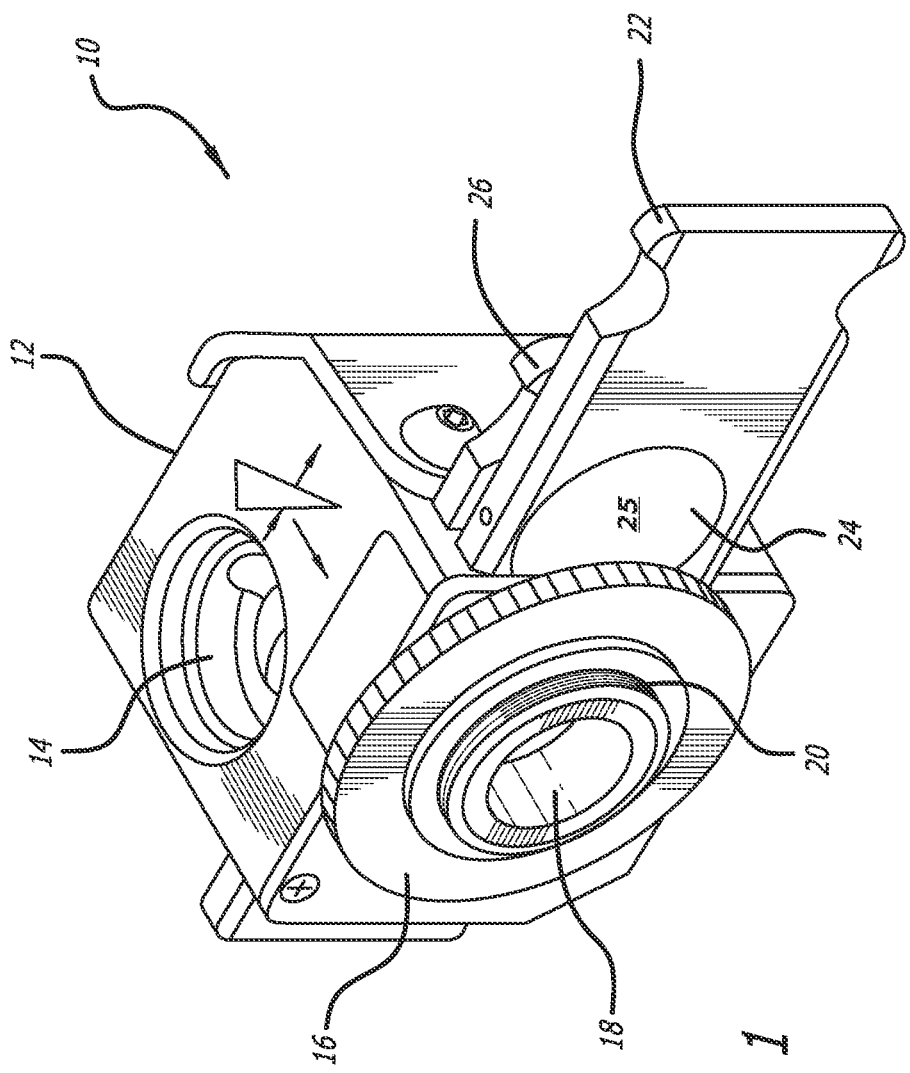
FIG. 1 shows an elevated perspective view of an embodiment of a nano-textured attenuator for with laser beam profiling and laser beam characterization systems.

The present application discloses various embodiments of a nano-textured attenuator for use with a variety of laser beam profiling systems, laser power measurement systems, and various other systems configured to measure or otherwise characterize laser beams or signals. In one embodiment, the nano-textured attenuator disclosed herein is well suited for use with laser beams in excess of about 200 Watts to 10,000 Watts (i.e., "high power") or more, although those skilled in the art will appreciate that the various embodiments of the nano-textured attenuator disclosed herein may be used with laser beams at any variety of laser powers. The optical performance of the embodiments of the nano-textured attenuator disclosed herein are at least partially enabled by novel nanotextured optical surfaces having extremely low reflectivity (e.g., two nano-textured surfaces capable of attenuating a 10 kilowatt input laser beam to approximately 10 nanowatts incident on the sensor of a beam-profiling camera). Those skilled in the art will appreciate that the physical dimensions and configuration of the embodiments of the nano-textured attenuator disclosed herein are intended to illustrate the operation of the nano-textured attenuator and are not intended to limit the components and characteristics of the nano-textured attenuator to those embodiments disclosed.

The terms "beam" and "optical signal" used herein refer to optical radiation incident on, reflected by, or transmitted through nano-textured surfaces of the optical elements described in the embodiments below. These terms are generally used interchangeably as required in order to recite the novel features of the embodiments disclosed herein. The sources of the beams or optical signals may include coherent sources (e.g., lasers), partially coherent sources, or incoherent sources (e.g., broadband lamps).

FIGS. 1-4 show various views of an embodiment of a nano-textured attenuator for use with laser beam profiling systems, laser measurements systems, and similar laser beam characterization systems. In the illustrated embodiment, the nano-textured attenuator 10 includes a body 12 having at least one input aperture 14 formed therein. In the illustrated embodiment, a single input aperture 14 is formed in the body 12, although those skilled in the art will appreciate that any number of input apertures 14 may be formed on the body 12. Further, the input aperture 14 may be formed on any surface of the body 12. Optionally, the input aperture 14 may be formed having any variety of transverse dimensions, shapes, or configurations. Further, the input aperture 14 may include one or more windows or protective elements enclosing the input aperture 14. Optionally, the input aperture 14 not include one or more protective windows.

Referring again to FIGS. 1-4, at least one coupling fixture 16 may be formed on or coupled to the body 12. In the illustrated embodiment, the coupling fixture 16 defines at least one profiling and/or measurement aperture or characterization aperture 18 (hereinafter measurement aperture 18) therein. Like the input aperture 14, the measurement aperture 18 may or may not include at least one protective window. Optionally, any number of measurement apertures 18 may be formed on or positioned proximate to the coupling fixture 16. Further, the coupling fixture 16 may include at least one coupling member or feature 20 thereby permitting one or more cameras, sensors, characterization systems, or similar devices to be coupled to the body 12 of the nano-textured attenuator 10. In one embodiment, the coupling member 20 comprises one or more threaded features permitting one or more cameras, sensors, characterization systems, or similar devices to be selectively coupled to and/or detached from the body 12 of the nano-textured attenuator 10. Those skilled in the art will appreciate that any variety of coupling members 20 or similar coupling features may be used to selectively couple and/or detach one or more cameras, sensors, characterization systems, or similar devices to the body 12 of the nano-textured attenuator 10 disclosed herein. In another embodiment, the coupling member 20 may be configured to couple one or more fiber-optic devices or other systems to the body 12. Optionally, the coupling feature 16 may be configured to have one or more cameras, sensors, characterization systems, or similar devices non-detachably coupled to the body 12. For example, at least one camera, sensor, characterization system, or similar device may be integrally formed on or within the body 12 of the nano-textured attenuator 10. As such, the coupling fixture 16 need not include a coupling member 20.

Figure 2:
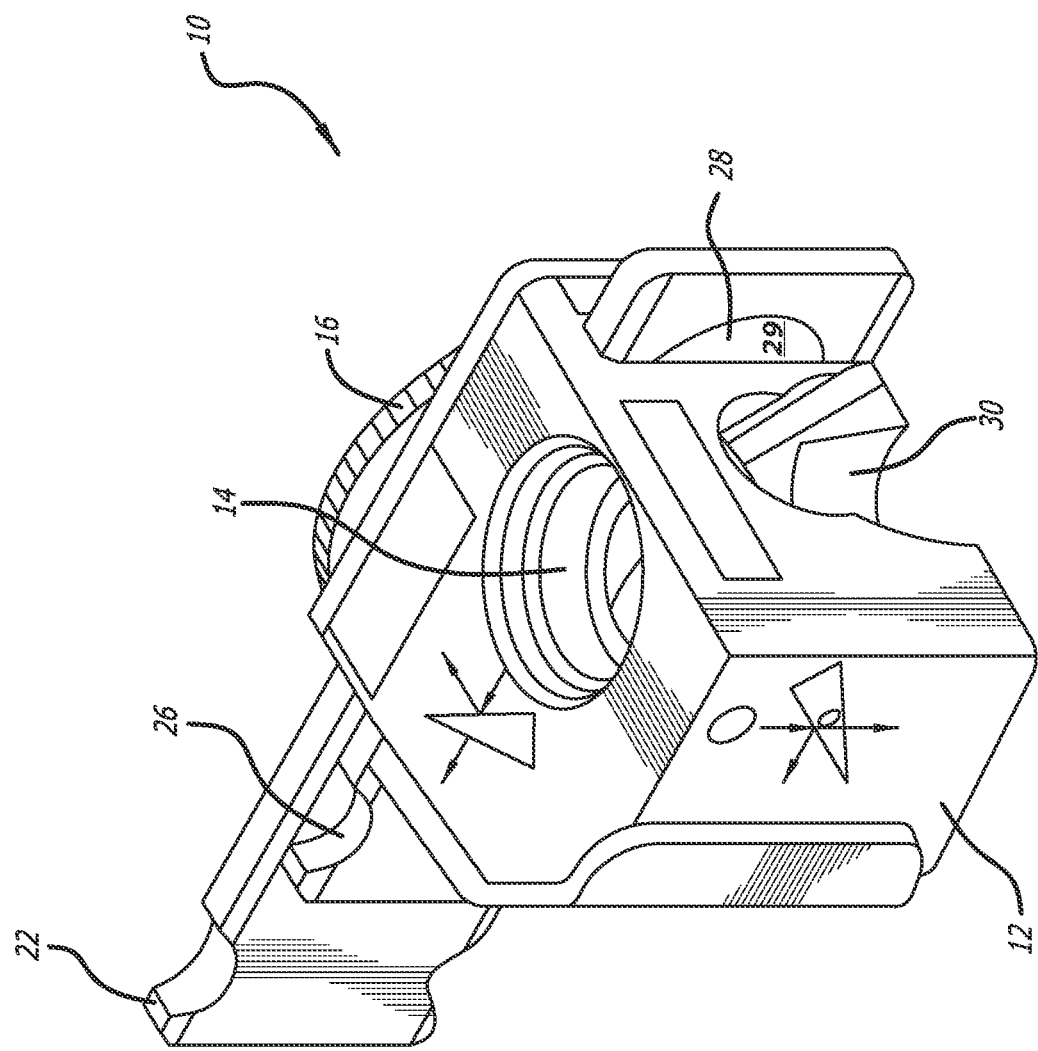
FIG. 2 shows alternate elevated perspective view of an embodiment of the nano-textured attenuator for use with laser beam profiling and laser beam characterization systems.

As shown in FIGS. 1-6, the nano-textured attenuator 10 may include one or more attenuator or filter bodies configured to be selectively inserted into and withdrawn from at least one beam path formed within the body 12. As shown, the attenuator filter bodies may be positioned between the input aperture 14 and the measurement aperture 18. In the illustrated embodiment, a first attenuator/filter body 22 and a second attenuator/filter body 26 may be selectively inserted into and withdrawn from the body 12. Those skilled in the art will appreciate that any number of attenuator/filter bodies may be used in the embodiments of the nano-textured attenuator 10 disclosed herein. As shown in FIG. 1, the first attenuator/filter body 22 includes at least a first filter receiver 24 form thereon and configured to receive and retain at least a first filter or optical component 25 therein. Similarly, as shown in FIG. 2, at least a second filter receiver 28 may be formed in or coupled to the second attenuator/filter body 26. Like the first filter receiver 24, the second filter receiver 28 may be configured to receive and retain at least one filter or optical component 29 therein. For example, the first filter receiver 24 and/or the second filter receiver 28 may be configured to receive and retain at least one attenuator, optical component, filter, polarizer, wave plate, diffuser, or similar device therein. For example, in one embodiment at least one of the first filter 25 and the second filter 29 may comprise at least one thin film coated optical filter therein. During use, the first attenuator/filter body 22 and/or the second attenuator/filter body 26 may be selectively inserted into or withdrawn from at least one optical pathway formed within the body 12. As such, filters or optical components retained by the first attenuator/filter body 22 and/or the second attenuator/filter body 26 may be inserted into withdrawn from at least one optical pathway formed within the body 12. In the illustrated embodiment, the first attenuator/filter body 22 and the second attenuator/filter body 26 may be manually actuated. Optionally, at least one of the first attenuator/filter body 22 and the second attenuator/filter body 26 may include one or more mechanical actuators permitting autonomous insertion and withdrawal of at least one of the first attenuator/filter body 22 and the second attenuator/filter body 26 from the body 12.

Figure 3:
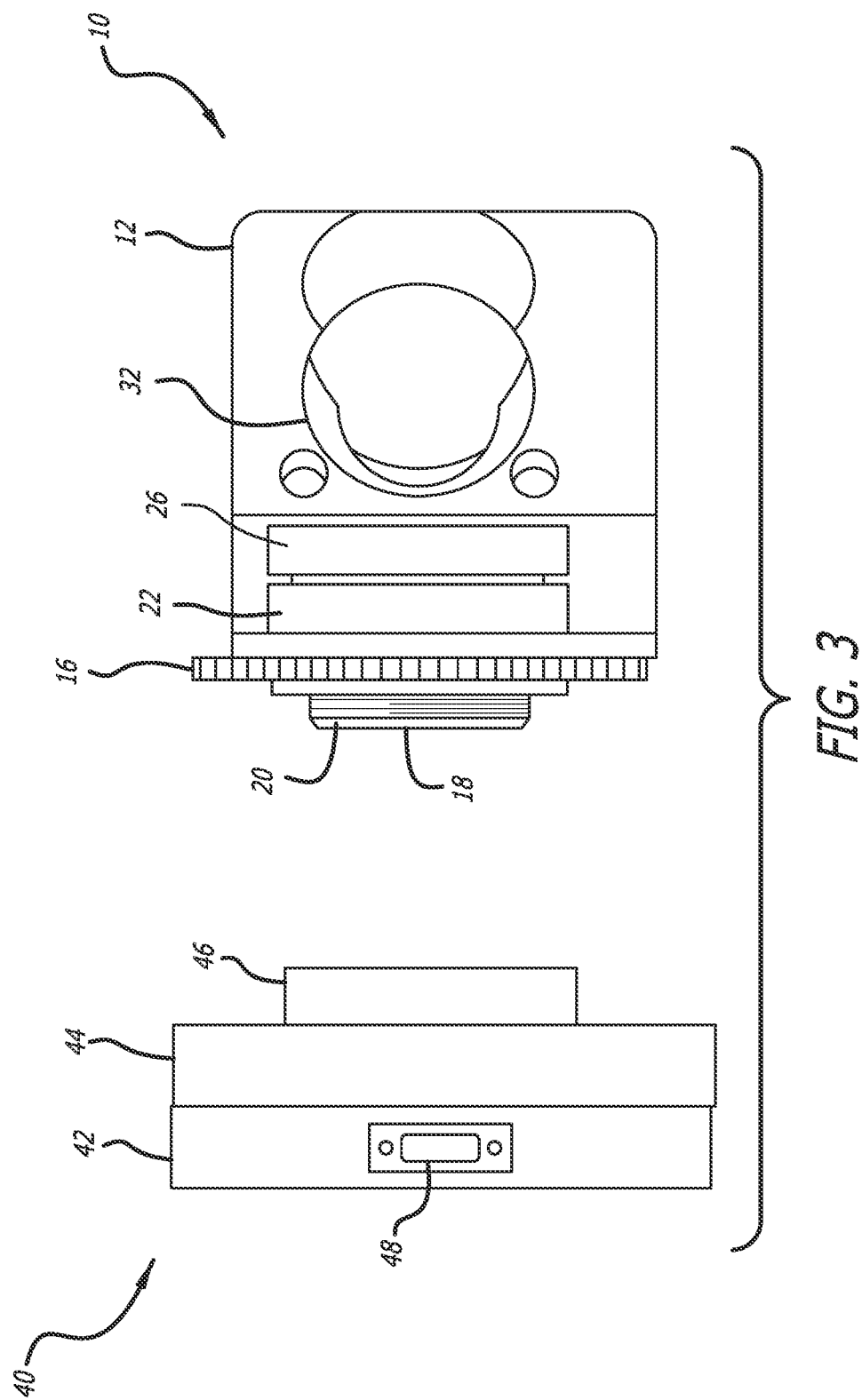
FIG. 3 shows a planar side view of an embodiment of a nano-textured attenuator having a camera system coupled thereto for use with laser beam profiling and laser beam characterization systems.
Figure 4:
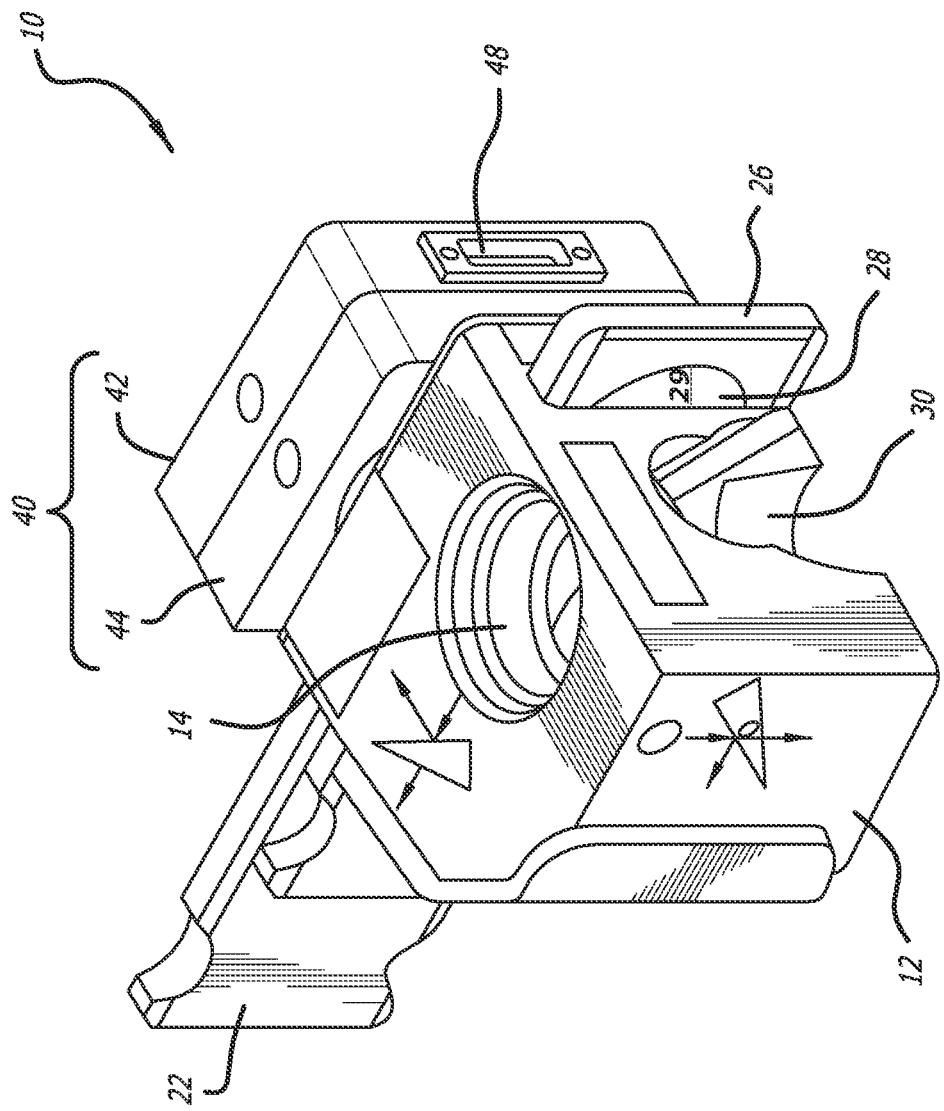
FIG. 4 shows an elevated perspective view of an embodiment of a nano-textured attenuator having a camera system coupled thereto for use with laser beam profiling and laser beam characterization systems.

As shown in FIGS. 2-4, one or more beam dump passages or apertures may be formed on the body 12. For example, as shown in FIGS. 2 and 4, a first beam dump aperture 30 is formed on the body 12, while FIG. 3 shows a second beam dump aperture 32 formed on the body 12. As such, in the embodiments shown in FIGS. 2-4, the nano-textured attenuator 10 includes a first beam dump aperture 30 and at least a second beam dump aperture 32 formed on the body 12. Those skilled in the art will appreciate that any number of beam dump apertures may be formed on the body 12 of the nano-textured attenuator 10. During use, the first beam dump aperture 30 and the second beam dump aperture 32 may be configured to permit at least one output beam to be transmitted or emitted therefrom. As such, the first beam dump aperture 30 may be configured to be positioned proximate to at least one beam dump (not shown). Similarly, the second beam dump aperture 32 may likewise be configured to be positioned proximate to at least a second beam dump (not shown). In another embodiment, at least one of the first beam dump aperture 30 and the second beam dump aperture 32 may be configured to transmit or otherwise emit at least one output beam from the body 12.

As described above, the nano-textured attenuator 10 may be configured to be coupled to and/or be positioned proximate to at least one camera, sensor, characterization system, or similar device. FIGS. 3 and 4 show various views of an embodiment of a nano-textured attenuator 10 having one or more cameras, sensors, characterization systems, or similar devices 40 coupled thereto. As shown, in one embodiment, the camera 40 includes a first camera body 42 and a second camera body 44. At least one camera coupling device or system 46 may be coupled to or formed on at least one of the first camera body 42 and the second camera body 44. During use, the camera coupling device 46 may be configured to selectively engage and be retained by the coupling member 20 formed on the coupling fixture 16 of the body 12 (see FIG. 1). Optionally, the camera coupling device 46 may be configured to selectively engage or be coupled to a portion of the body 12 such that at least a portion of the camera 40 is in communication with the measurement aperture 18 formed in the body 12. Optionally, the camera 40 need not be detachable from the body 12. In the illustrated embodiment, the camera 40 includes at least one output and/or data coupler 48, thereby permitting measurement or characterization data recorded by the camera 40 to be provided to at least one external processor (not shown). Those skilled in the art will appreciate that any variety of camera systems or devices may be used with or coupled to the body 12 of the nano-textured attenuator 10. Exemplary camera systems or devices include, without limitation, 2-D matrix sensors, CCD devices, CMOS devices, InGaAs devices, polarization sensor or measuring devices, spectral or temporal measurement devices, power meters, and the like.

Figure 5:
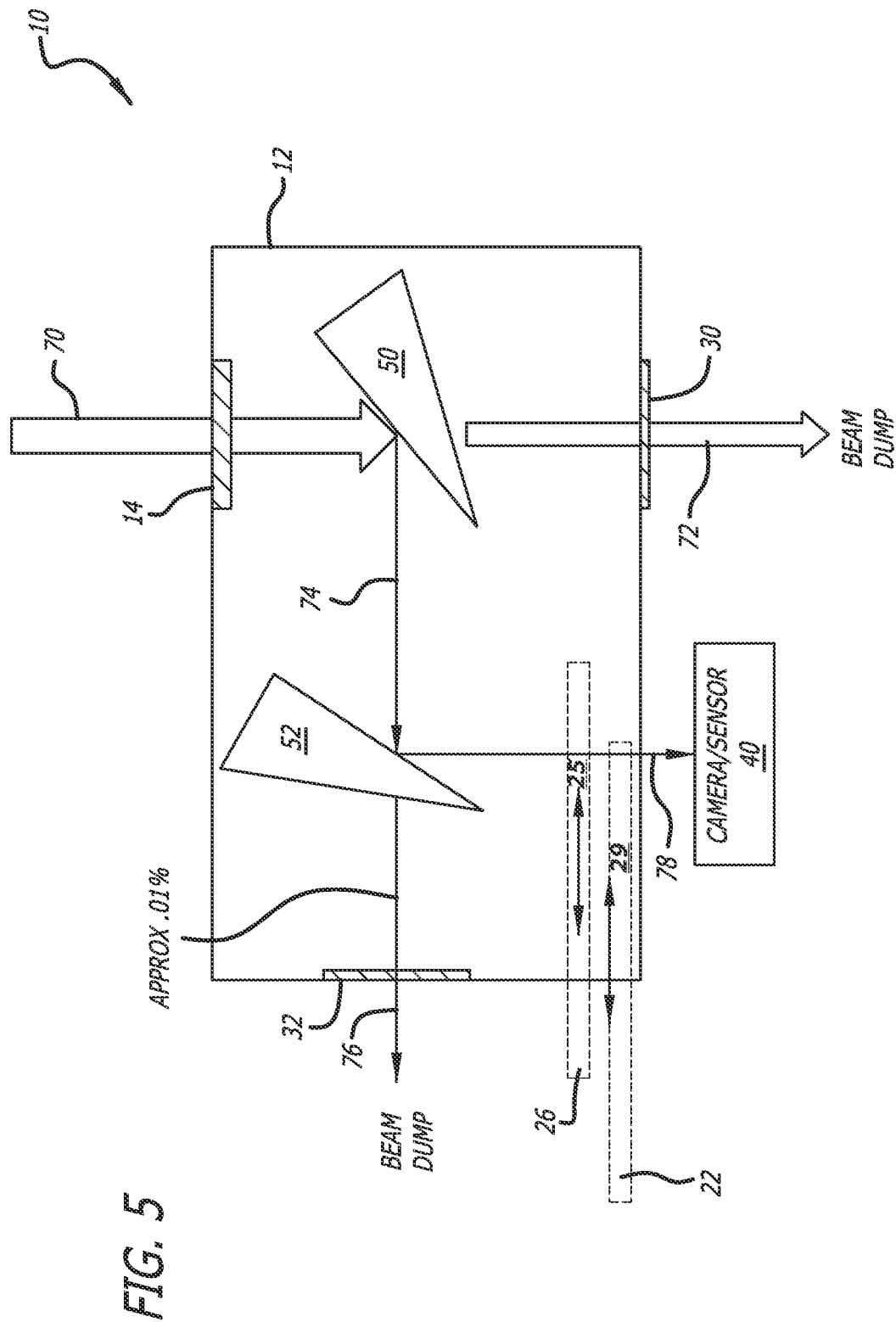
FIG. 5 shows a schematic diagram of the internal components of an embodiment of a nano-textured attenuator for use with laser beam profiling and laser beam characterization systems.

FIG. 5 shows the internal components of an embodiment of a nano-textured attenuator. As shown in FIG. 5, a first nano-textured beamsplitter or prism 50 and at least a second nano-textured beamsplitter 52 may be positioned within the body 12, although those skilled in the art will appreciate that any number of nano-textured beamsplitters, prisms, or alternate nano-textured optical elements may be positioned within the body 12. In one embodiment, at least one of the first nano-textured beamsplitter 50 and the second nano-textured beamsplitter 52 may be positioned on at least one selectively adjustable optical mount. As such, the position and/or orientation of at least one of the first nano-textured beamsplitter 50 and/or the second nano-textured beamsplitter 52 may be selectively adjusted by a user. Optionally, at least one of the first nano-textured beamsplitter 50 and the second nano-textured beamsplitter 52 may be positioned on fixed optical mounts such that the position and/or orientation of the first nano-textured beamsplitter 50 and/or the second nano-textured beamsplitter 52 is fixed.

As shown in FIG. 5, during use, an input beam 70 (also referred to herein as "input laser signal" or "incident optical signal") may be directed into the body 12 of the nano-textured attenuator 10 via the input aperture 14. The input beam 70 may be incident on a portion of the first nano-textured beamsplitter 50 positioned within the body 12. As a result, a portion of the input beam 70 may be reflected or otherwise directed by the first nano-textured beamsplitter 50 to form a partially attenuated beam 74 which is directed within the body 12. In one embodiment, at least one of the first and second nano-textured beamsplitters 50, 52 are manufactured from Corning™ 7980 Grade OF UV fused silica having undergone one or more nano-texturing processes, although those skilled in the art will appreciate that any variety of substrates may be used to form the first and second nano-textured beamsplitters 50, 52. Optionally, one or more thin film coatings may also be applied to at least one of the first and second nano-textured beamsplitters 50, 52. Exemplary thin film coatings include AR coatings and the like. Further, a portion of the input beam 70 is transmitted through the first nano-textured beamsplitter 50 to form a first output beam 72 (also referred to herein as "first output signal 72"). In the illustrated embodiment, the first output beam 72 may be emitted from the body 12 via the first beam dump aperture 30. In one embodiment, the first nano-textured beamsplitter 50 is configured to transmit approximately 95% to about 99.9999% of the power and/or fluence of the input beam 70 therethrough. As such, the first output beam 72 encompasses approximately 95% to about 99.9999% the power and/or fluence of the input beam 70, which may be directed to one or more external beam dumps (not shown). As such, the partially attenuated beam 74 traversing through the body 12 encompasses approximately 5% to about 0.0001% or less of the power and/or fluence of the input beam 70.

Referring again to FIG. 5, at least a portion of the partially attenuated beam 74 may be incident on a portion of the second nano-textured beamsplitter 52 positioned within the body 12. Like the first nano-textured beamsplitter 50, the second nano-textured beamsplitter 52 is configured to transmit approximately 95% to about 99.9999% of the power and/or fluence of an incident optical signal (e.g., the partially attenuated beam 74) therethrough. As such, approximately 95% to about 99.9999% the power and/or fluence of the partially attenuated beam 74 incident on the second nano-textured beamsplitter 52 is transmitted therethrough to form a second output beam 76. In one embodiment, the second output beam 76 is directed through the second beam dump aperture 32 to one or more external beam dumps (not shown). Further, approximately 5% to about 0.0001% or less of the power and/or fluence of the partially attenuated beam 74 may be directed by the second nano-textured beamsplitter 52 to form at least one attenuated measurement beam 78 (also referred to herein as "attenuated measurement signal 78") directed to the camera/sensor 40 coupled to the body 12. In one embodiment, the attenuated measurement beam 78 encompasses approximately 0.25% to about 0.001% or less of the power and/or fluence of the input beam 70. In another embodiment, the attenuated measurement beam 78 encompasses approximately 0.000001% or less of the power and/or fluence of the input beam 70. Those skilled in the art will appreciate that the transmission characteristics of the first nano-textured beamsplitter 50 and second nano-textured beamsplitter 52 may range from about 85% to about 99.99999% transmission of all laser radiation (e.g., laser beams or optical signals) incident thereon. As such, the laser radiation reflected by at least one of the first nano-textured beamsplitter 50 and the second nano-textured beamsplitter 52 may contain about 15% to about 0.00001% or less of the power and/or fluence of the incident laser radiation.

As shown in FIG. 5, as stated above, the attenuated measurement beam 78 may be directed to the camera/sensor 40 coupled to the body 12. Optionally, the attenuated measurement beam 78 may traverse through at least one of the first filter 25 located in the first attenuator/filter body 22, and/or the second filter 29 positioned in the second attenuator/filter body 26 to further attenuate or otherwise filter the attenuated measurement beam 78.

Figure 6:
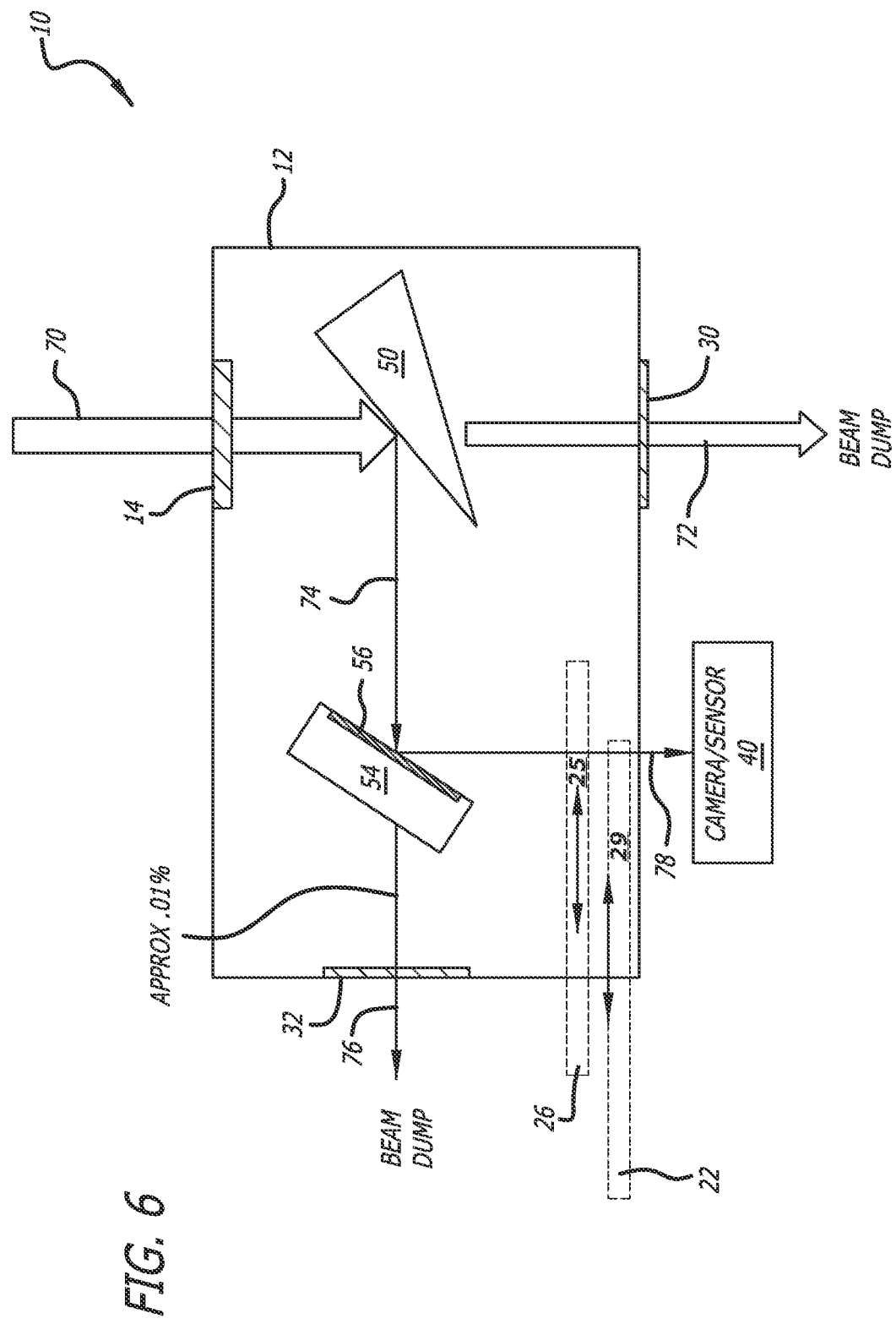
FIG. 6 shows a schematic diagram of the internal components of another embodiment of a nano-textured attenuator for use with laser beam profiling and laser beam characterization systems.

Optionally, the nano-textured attenuator 10 may include a single nano-textured beamsplitter, prism, or optical element within the body 12. For example, FIG. 6 shows an alternate embodiment of a nano-textured attenuator 10 having a single nano-textured beamsplitter 50 within the body 12. Like the previous embodiment, the first nano-textured beamsplitter 50 is configured to transmit approximately 95% to about 99.9999% the power and/or fluence of the input beam 70 therethrough. As such, the first output beam 72 encompasses approximately 95% to about 99.9999% the power and/or fluence of the input beam 70, which may be directed to one or more external beam dumps (not shown). As such, the partially attenuated beam 74 traversing through the body 12 encompasses approximately 5% to about 0.0001% or less of the power and/or fluence of the input beam 70.

At least a portion of the partially attenuated beam 74 may be incident on a portion of at least one optical component 54 positioned within the body 12. In one embodiment, the optical component 54 comprises one or more lenses, beamsplitters, wave plates, polarizers, and the like. Further, the optical component 54 may include one or more optical coatings 56 applied thereto. Exemplary optical coatings 56 include, without limitation, anti-reflection (AR) coatings, thin-film coatings, and the like. Optionally, the optical component 54 may comprise a nano-textured substrate, a grating, or a similar optical component. The optical component 54 may be configured to transmit approximately 95% to about 99.9999% the power and/or fluence of incident optical radiation therethrough. As such, approximately 95% to about 99.9999% the power and/or fluence of the partially attenuated beam 74 incident on the optical component 54 is transmitted therethrough to form a second output beam 76. In one embodiment, the second output beam 76 is directed through the second beam dump aperture 32 to one or more external beam dumps (not shown). Further, approximately 5% to about 0.0001% or less of the power and/or fluence of the partially attenuated beam 74 may be directed by the optical component 54 to form an attenuated measurement beam 78 which may be directed to the camera/sensor 40 coupled to the body 12. In one embodiment, the attenuated measurement beam 78 encompasses approximately 0.25% to about 0.0001% or less of the power and/or fluence of the input beam 70. In another embodiment, the attenuated measurement beam 78 encompasses approximately 0.000001% or less of the power and/or fluence of the input beam 70. Those skilled in the art will appreciate that the transmission characteristics of the first nano-textured beamsplitter 50 and the optical component 54 may range from about 85% to about 99.99999% transmission of all optical radiation (e.g., laser beams or optical signals) incident thereon. As such, an optical signal reflected by at least one of the first nano-textured beamsplitter 50 and the optical component 54 may contain about 15% to about 0.00001% or less of the power and/or fluence of the incident radiation.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

What is claimed:

1. A nano-textured attenuator for use in laser beam characterization systems, comprising:
   a body defining at least one input aperture, at least one measurement aperture, and at least one first beam dump aperture;
   a first beamsplitter positioned within the body, the first beamsplitter having a surface having undergone a nano-texturing process, the surface allowing 99.99% to 99.99999% of an input beam to be transmitted therethrough and allowing 0.01% to 0.00001% of the input beam to be reflected therefrom to form at least one partially attenuated beam;
   at least a second beamsplitter positioned within the body, the second beamsplitter having a surface having undergone a nano-texturing process, the surface allowing 99.99% to 99.99999% of the at least one partially attenuated beam to be transmitted therethrough and allowing 0.01% to 0.00001% of the at least one partially attenuated beam to be reflected therefrom to form at least one attenuated measurement beam; and
   at least one camera system in communication with the at least one measurement aperture, the at least one camera system configured to receive the at least one attenuated measurement beam and measure at least one characteristic of the at least one attenuated measurement beam.

2. The nano-textured attenuator of claim 1, further comprising at least one selectively movable mount configured to adjustably support at least one of the first beamsplitter and the at least a second beamsplitter.

3. The nano-textured attenuator of claim 1, wherein at least one of the at least one input aperture, the at least one measurement aperture, and the at least one first beam dump aperture includes at least one protective window.

4. The nano-textured attenuator of claim 1, wherein the 99.99% to 99.99999% of the at least one partially attenuated beam forms a second output beam directed through at least one second beam dump aperture.

5. A nano-textured attenuator for use in laser beam characterization systems, comprising:
   a body defining at least one input aperture, at least one measurement aperture, and at least one first beam dump aperture;
   a beamsplitter positioned within the body, the beamsplitter having a surface having undergone a nano-texturing process, the surface allowing 99.99% to 99.99999% of an input beam to be transmitted therethrough and allowing 0.01% to 0.00001% of the input beam to be reflected therefrom to form at least one partially attenuated beam;
   at least one optical element positioned within the body, the at least one optical element having a surface having undergone a nano-texturing process, the surface allowing 99.99% to 99.99999% of the at least one partially attenuated beam to be transmitted therethrough and allowing 0.01% to 0.00001% of the at least one partially attenuated beam to be reflected therefrom to form at least one attenuated measurement beam; and
   at least one camera system in communication with the at least one measurement aperture, the at least one camera system configured to receive the at least one attenuated measurement beam and measure at least one characteristic of the at least one attenuated measurement beam.

6. The nano-textured attenuator of claim 5, further comprising at least one selectively movable mount configured to adjustably support at least one of the beamsplitter and the at least one optical element.

7. The nano-textured attenuator of claim 5, wherein at least one of the at least one input aperture, at least one measurement aperture, and at least one beam dump aperture includes a protective window.

8. The nano-textured attenuator of claim 5, wherein the at least one optical element is a beamsplitter.

9. The nano-textured attenuator of claim 5, wherein the at least one optical element is a wave plate.

10. The nano-textured attenuator of claim 5, wherein the at least one optical element is a lens.

11. A method of measuring an optical signal, comprising:
    providing a nano-textured attenuator having a first beamsplitter, at least a second beamsplitter, and at least one beam dump aperture;
    directing at least one input beam to the first beamsplitter;
    reflecting a portion of the at least one input beam with the first beamsplitter to form at least one partially attenuated beam, the at least one partially attenuated beam having 0.01% to 0.00001% of a power of the at least one input beam while transmitting 99.99% to 99.99999% of the at least one input beam through the first beamsplitter;
    reflecting a portion of the at least one partially attenuated beam from the first beamsplitter with the at least a second textured beamsplitter to form at least one attenuated measurement beam, the at least one attenuated measurement beam having of the at least one partially attenuated beam while transmitting 99.99% to 99.99999% of the at least one partially attenuated beam through the at least a second beamsplitter; and
    directing at least a portion of the at least one input beam through the at least one beam dump aperture;
    measuring at least one optical characteristic of the at least one attenuated measurement beam with at least one sensor system.

* * * * *